United States Patent Office 2,707,876
Patented May 10, 1955

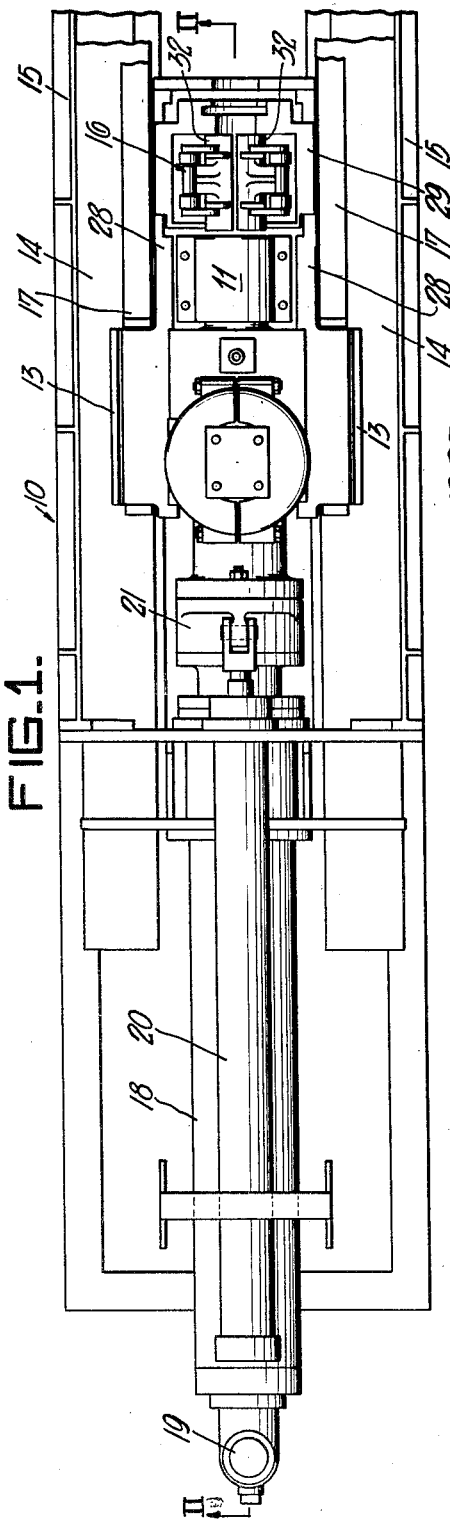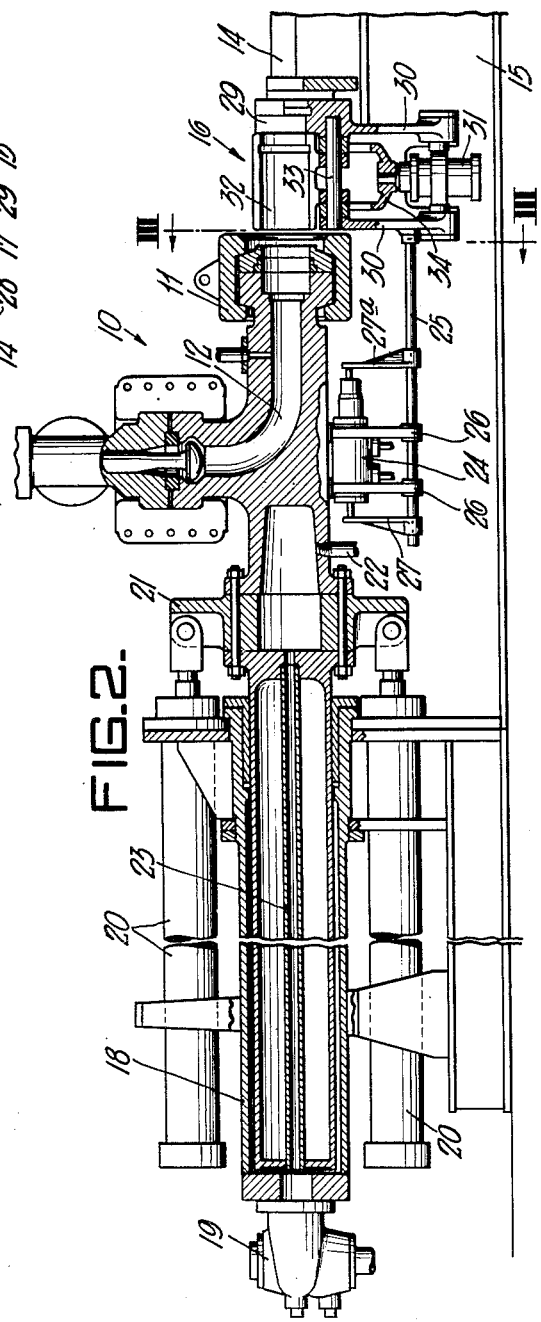

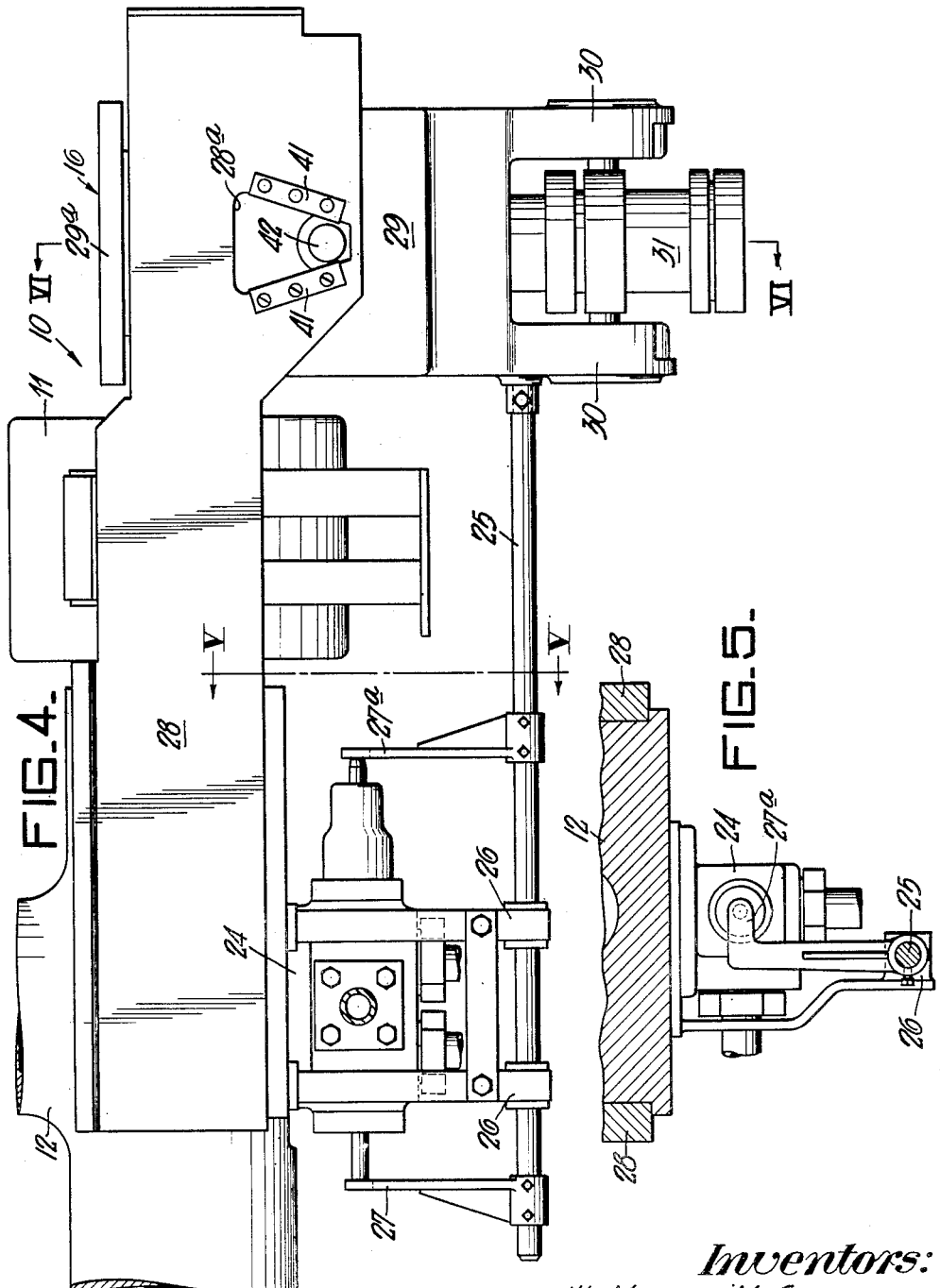

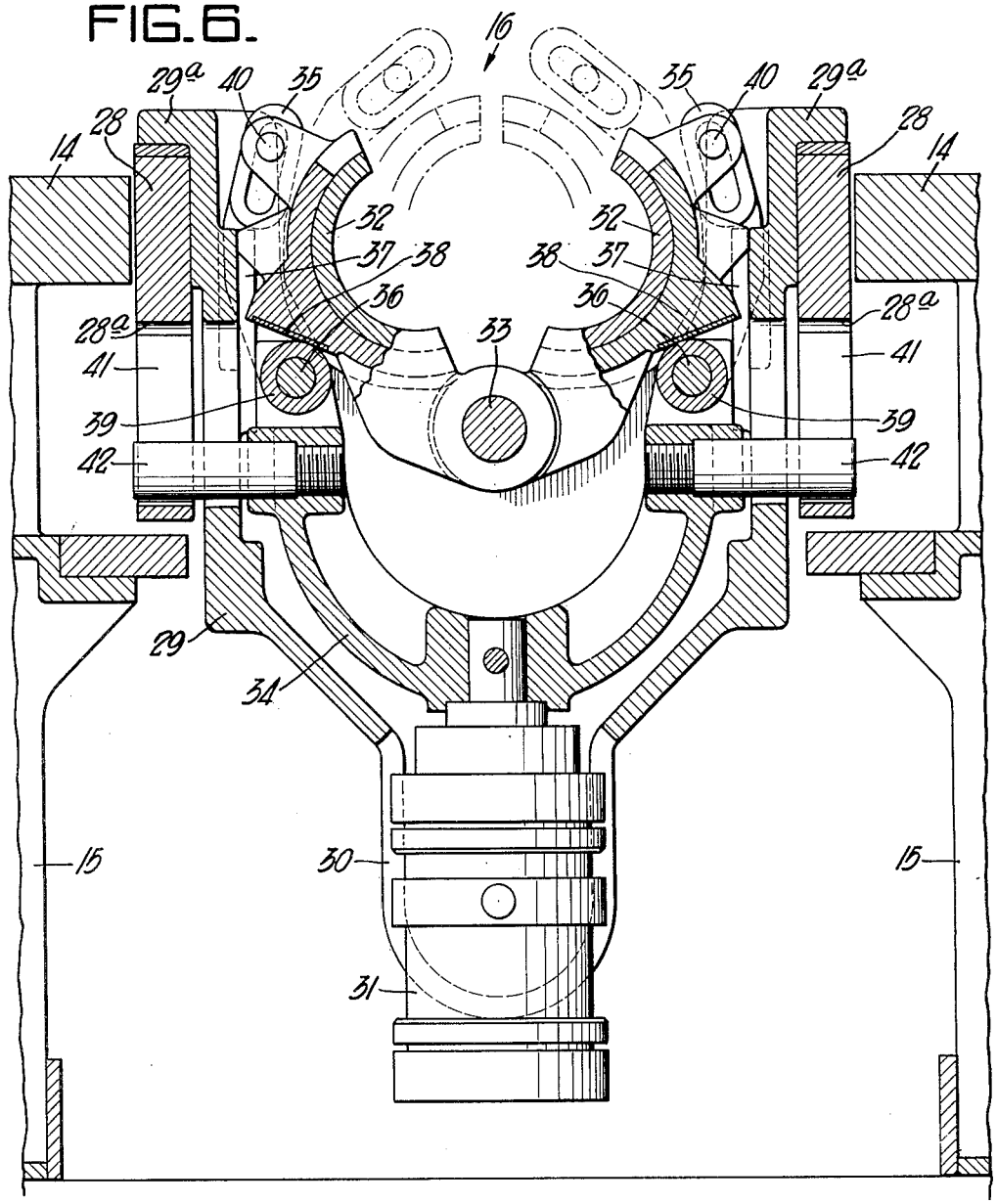

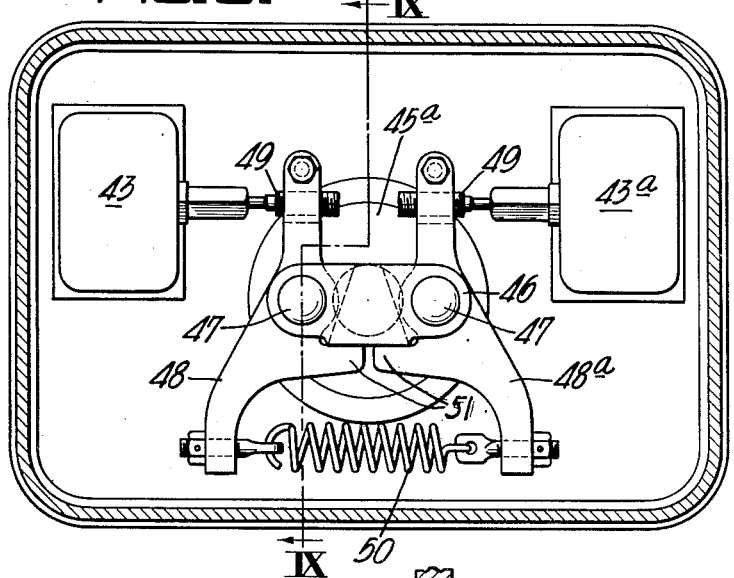
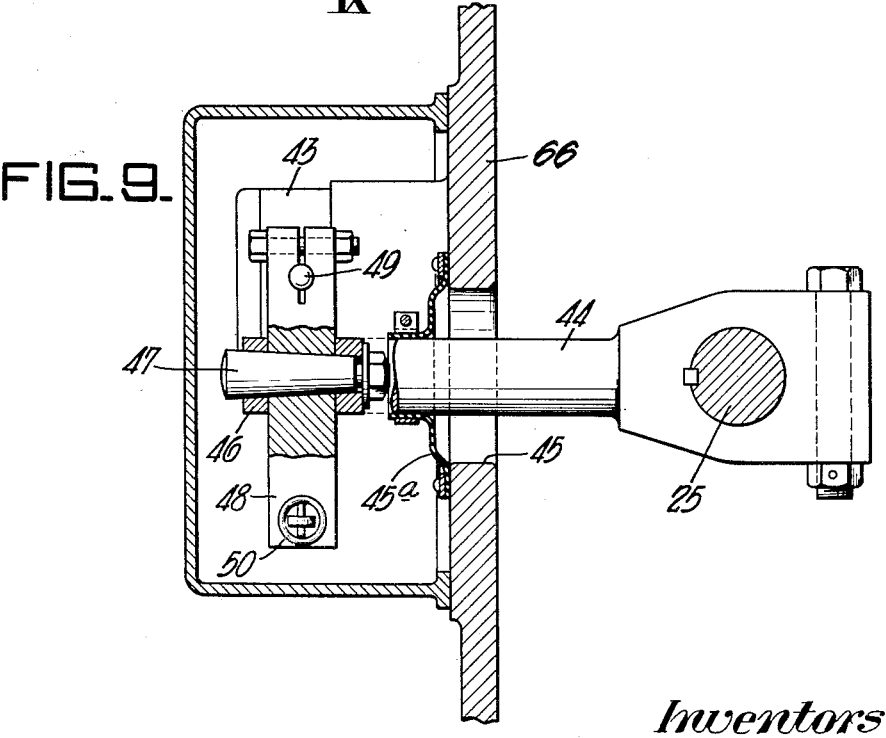

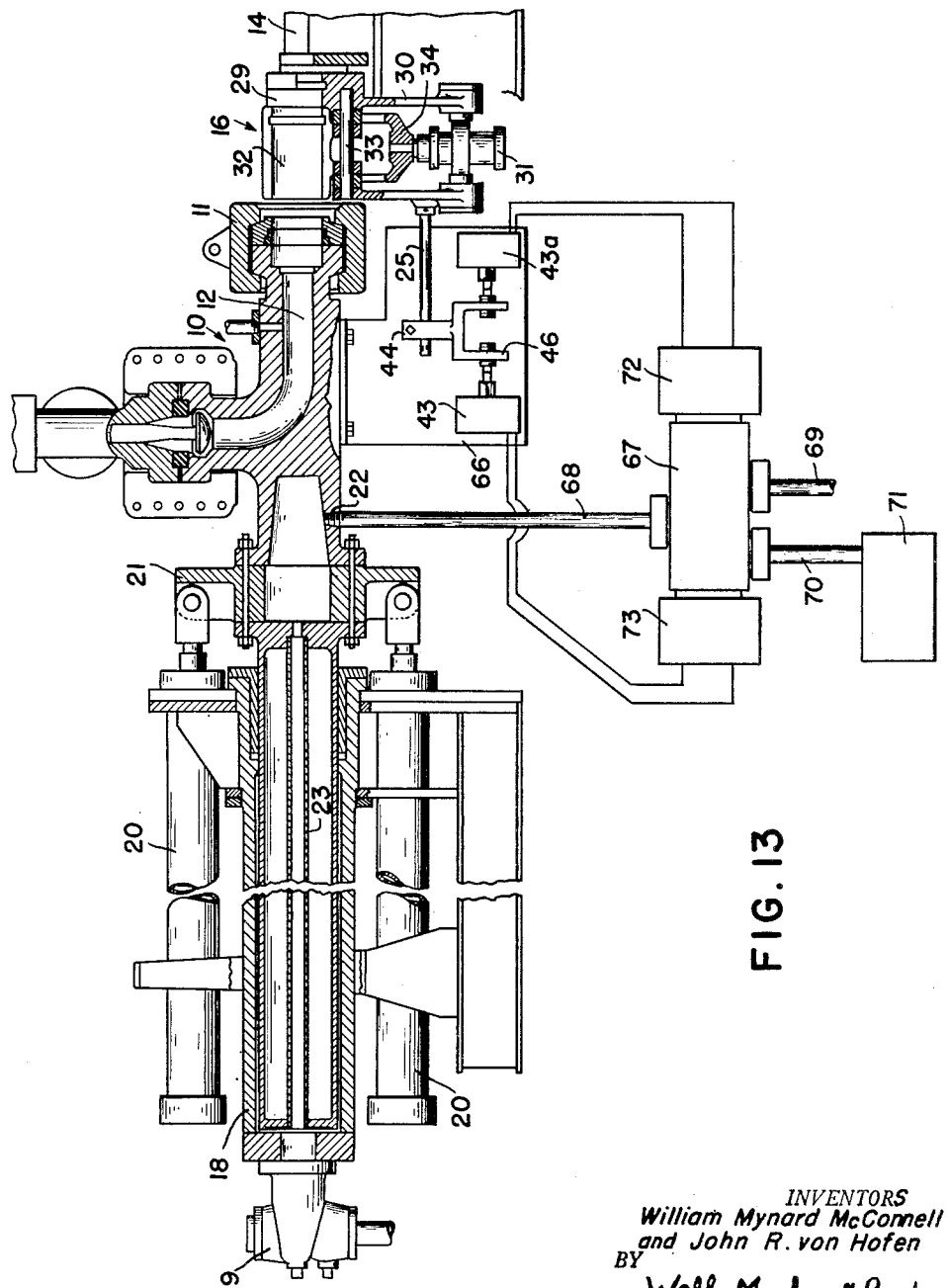

2,707,876

AUTOMATIC FOLLOW-UP CONTROL FOR TEST HEAD OF PIPE-TESTING MACHINE

William Mynard McConnell, McKeesport, and John R. Von Hofen, Pittsburgh, Pa., assignors to Taylor-Wilson Manufacturing Company, McKees Rocks, Pa., a corporation of Pennsylvania Application September 6, 1951, Serial No. 245,304

7 Claims. (Cl. 73—37)

This invention relates generally to pipe-testing machines and, in particular, to automatic control means for maintaining a substantially constant spacing between the end of the pipe length being tested and the inner end of the bore in the test head which receives it and makes sealing engagement therewith.

Pipe-testing machines as usually constructed heretofore have included spaced test heads adapted to receive the ends of a pipe length disposed therebtween and make a fluid-tight seal therewith, one of the heads being relatively fixed in a supporting frame and the other being reciprocable axially of the pipe length to permit the latter to be inserted between the heads and removed therefrom. The heads have seals engaging either the ends of the pipe or its exterior adjacent the ends and the pipe is tested by admitting water under high pressure into the interior. The increasingly high performance standards demanded by pipe users have necessitated progressively higher test pressures. Thus, certain kinds of pipe must be tested under pressures as high as 10,000 p. s. i. Internal pressures of this magnitude measurably expand the pipe radially within the elastic limit and the expansion is accompanied by a proportional decrease in the length. Conversely, on release of the pressure and radial contraction to the original size, the pipe elongates slightly. While the change in length is slight, it is sufficient to alter the relation between the test heads and the ends of the pipe so as to break the seal or even to damage the sealing collars or rings which make contact with the pipe ends.

We have invented a novel automatic control mechanism which responds to any change in the length of the pipe under test and immediately adjusts the position of the test heads to compensate therefor. The invention thus maintains a substantially constant spacing between the ends of the pipe length and the inner ends of the bores in the test heads which receive them. In a preferred embodiment, we provide a gripper adapted to seize the pipe length at a point spaced inwardly from the end thereof. An actuating member extends from the gripper to a device controlling the admission of pressure fluid to a hydraulic motor which adjusts the test head toward and from the pipe end. The gripper is mounted for guided movement axially of the pipe length and thus, when the latter elongates or shortens as explained above, the control device is actuated to operate the motor accordingly. The control device may be a valve or a pair of electric switches controlling valves.

A complete understanding of the invention may be obtained from the following detailed description and explanation which refer to the accompanying drawings illustrating the preferred embodiment. In the drawings—

Figure 1 is a partial plan view showing the water end of a pipe-testing machine having the invention incorporated therein;

Figure 2 is a vertical section taken on the plane of line II—II of Figure 1;

Figure 4 is a partial side elevation to enlarged scale showing particularly the control device and the gripper which operates it;

Figure 5 is a partial transverse section taken on the plane of line V—V of Figure 4;

Figure 6 is a transverse section through the gripper taken on the plane of line VI—VI of Figure 4;

Figure 8 is an elevation thereof; and

Figure 9 is a vertical section taken on the plane of line IX—IX of Figure 8.

Figure 10:
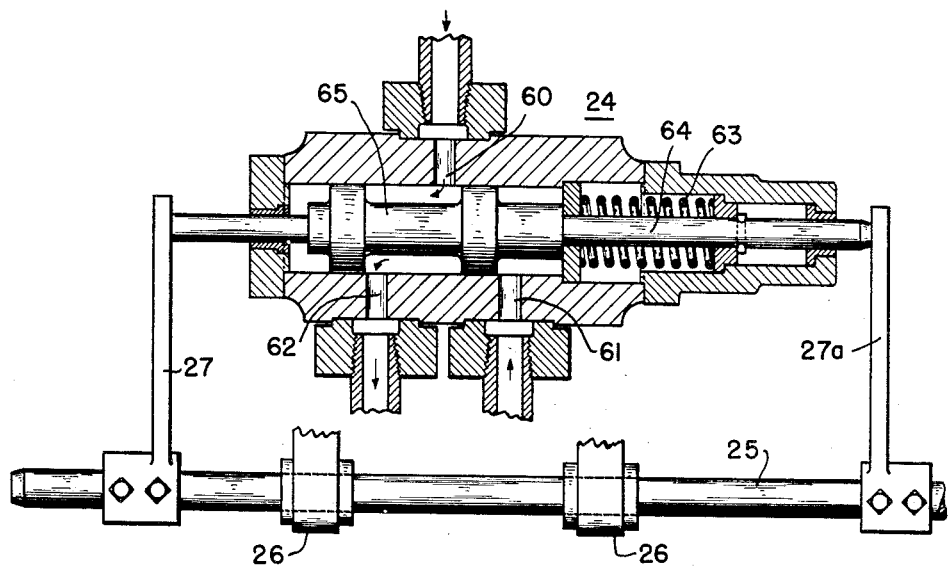
Figure 11:
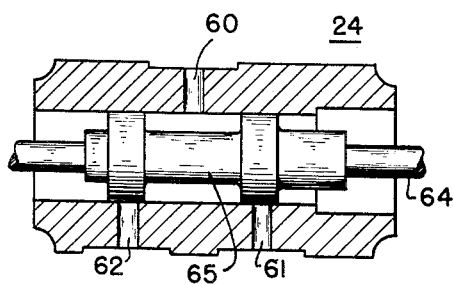
Figure 12:
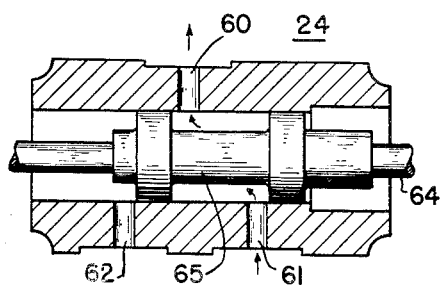

Figure 10 is a sectional view of valve 24. Figure 11 is a partial sectional view of valve 24 showing a valve spool in neutral position. Figure 12 is a partial section view of valve 24 showing the valve spool in position for admitting additional fluid to a master cylinder. Figure 13 is a modification of Figure 2 showing a solenoid actuated valve connected to the electric switches.

Referring now in detail to the drawings and, for the present, to Figures 1 and 2, the pipe-testing machine illustrated comprises a water end 10 including a test head 11 having a valved inlet 12. Supporting wedges 13 permit vertical adjustment of the water end. The wedges slide on ways 17 mounted on spaced tension rails 14 extending the full length of the machine and supported on side frames 15. A pipe gripper 16 is slidable on spaced side plates 23 extending inwardly from the water end beyond the test head. A hydraulic motor including a cylinder 18 mounted rigidly with the side frames 15 has its piston rod connected to the water end for adjusting it along ways 17 to accommodate dimensional variations in the pipe lengths within the permissible tolerance and also for advancing the test head into engagement with the end of a pipe length when it has been positioned in the machine. The cylinder has a control valve 19 at the outer end. Pull-back cylinders 20 exert a constant retracting force on the water end through a cross-head 21 but this force is overcome by that applied by motor 18 to advance the water end. Relief of fluid from cylinder 18 permits cylinders 20 to retract the water end. Cylinder 18 has an auxiliary inlet 22 controlled by a compensating valve 24. This inlet communicates with the outer end of the cylinder 18 by a pipe 23 through the piston. When the cylinder has been operated to advance the test head into engagement with a pipe length, valve 19 is closed.

Valve 24, as shown in Figures 2, 4 and 5, is of the piston type and is mounted below the water end. It is preferably a four-way closed center spring return servo valve controlling the admission of fluid to inlet 22 and its relief therefrom. By this arrangement, the water end may be moved slightly in either direction to compensate for shortening or elongation of the pipe being tested, on application and removal of the test pressure through the water end. For this purpose, we provide means for actuating valve 24 in accordance with the shortening or elongation of the pipe length. Such means takes the form of a push-rod 25 secured to the gripper 16 and extending through guide bearings 26 extending below the valve. The push-rod has fingers 27 and 27a extending upwardly therefrom, adapted to engage opposite ends of the piston rod of valve 24. It will thus be evident that, when a pipe length is being tested, the gripper 16 being operated to seize the pipe, in a manner to be explained hereinafter, contraction of the pipe length will cause movement of the gripper on walls 28. The resulting movement of rod 25 will actuate valve 24 to cause additional fluid to be supplied to cylinder 18 whereby the whole water end will be adjusted along ways 17 to compensate for the contraction of the pipe length, i. e., until the adjustment returns valve 24 to such position with respect to fingers 27 and 27a that the supply of additional fluid to cylinder 18 is cut off. Conversely, on elongation of the pipe length, rod 25 will actuate valve 24 to cause fluid to be relieved from cylinder 18 whereby cylinders 20 will retract the water end to the extent permitted by such relief, or until valve 24 is moved so that its piston is returned to neutral position. In short, the push-rod, being secured to the gripper which seizes the pipe, actuates the valve on shortening or elongation of the pipe and the correcting effect of the valve is terminated when the adjusting movement of the valve with the water end is such that the valve is restored to neutral by fingers 27 and 27a.

A test head similar to that shown at 11 is mounted in a carriage adapted to travel lengthwise of the machine, for engaging the other end of the pipe length being tested. The carriage has a cylinder for advancing the test head thereof as well as a pull-back cylinder for retracting it.

A study of Figures 10, 11 and 12 shows the operation of valve 24. Port 60 of valve 24 opens to inlet 22. Additional fluid enters valve 24 through port 61. Port 62 of valve 24 leads to a drain tank (not shown). Spring 63 around stem 64 tends to maintain valve spool 65 in neutral position. Figure 11 shows the valve spool 65 in neutral position blocking all ports. When a pipe contracts finger 27 connected to push-rod 25, moves spool 65 to the position shown in Figure 12, thus blocking port 62. With the spool in this position, additional fluid flows in port 61, through valve 24 and out port 60, as shown by the arrows, thence to inlet 22 and cylinder 18. When compensation for pipe contraction has been completed, rod 25 and fingers 27 and 27a return spool 65 to neutral position. When a pipe expands, finger 27a connected to push-rod 25 moves spool 65 to the position shown in Figure 10, thus blocking port 61. With the spool in this position, fluid flows from cylinder 18 out through inlet 22 to port 60, through valve 24, to port 62, thence to the drain tank (not shown). When compensation for pipe expansion has been completed, rod 25 and fingers 27 and 27a return spool 65 to neutral position. A valve similar to valve 24 is mounted on the test-head operating cylinder and is actuated by a push-rod secured to a pipe gripper on the carriage. Both test heads are thus adjusted appropriately on shortening or elongation of the pipe length. Referring now to Figure 6, the pipe gripper 16, as already explained, is disposed between spaced side plates 28 extending inwardly from the water end. The gripper comprises a cage 29 suspended between side plates 28. The cage has flanges 29a on opposite sides thereof riding on plates 28, is open at the top and has arms 30 depending from the bottom. A vertical fluid-pressure cylinder 31 is trunnioned in these arms. Semi-cylindrical clamping jaws 32 are pivoted on a pin 33 extending through the cage parallel to the axis of the machine. A jaw operating yoke 34 is mounted on the piston of cylinder 31 and has links 35 pivoted to the upper end thereof on pins 36 located on opposite sides. The yoke is movable vertically by cylinder 31 in ways 37 formed in the corners of the cage. Jaws 32 have cam surfaces 38 on the outer sides thereof. Rollers 39 on pins 36 engage these surfaces when the piston of cylinder 31 is raised, thereby closing the jaws. Links 35 have pin-and-slot connections 40 to the jaws whereby the latter are pulled open when the piston of cylinder 31 is retracted.

Side plates 28 have V-shaped openings 28a therein, the side edges of which are fitted with liners 41 (see Figs. 4 and 6). Yoke 34 has guide pins 42 extending laterally therefrom through slots in the cage and between the liners 41. When the jaws are closed to grip the pipe length, the pins 42 being raised have sufficient clearance with respect to the liners 41 to permit the desired freedom of movement of the gripper on plates 28 to follow the shortening and elongation of the pipe length. When the gripper is released, however, the descent of pins 42 between liners 41 centers the gripper longitudinally on plates 28 so it will be in correct position for seizing the next pipe length. When the yoke is in lower position, furthermore, the gripper is locked against accidental movement which would operate valve 24.

Figure 3:
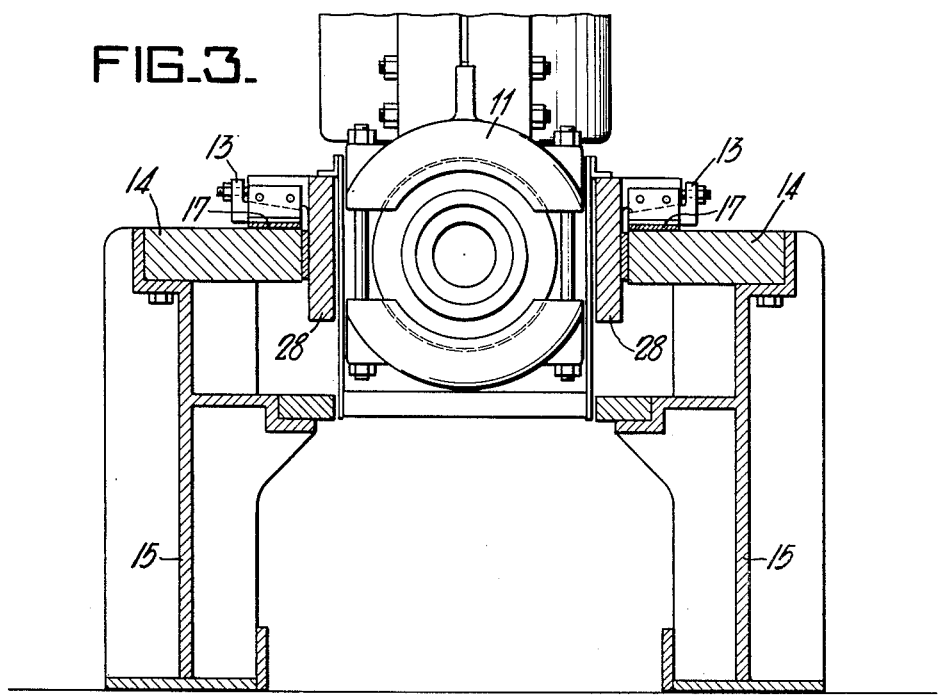
Figure 3 is a cross section taken along the plane of line III—III of Figure 2.
Figure 7:
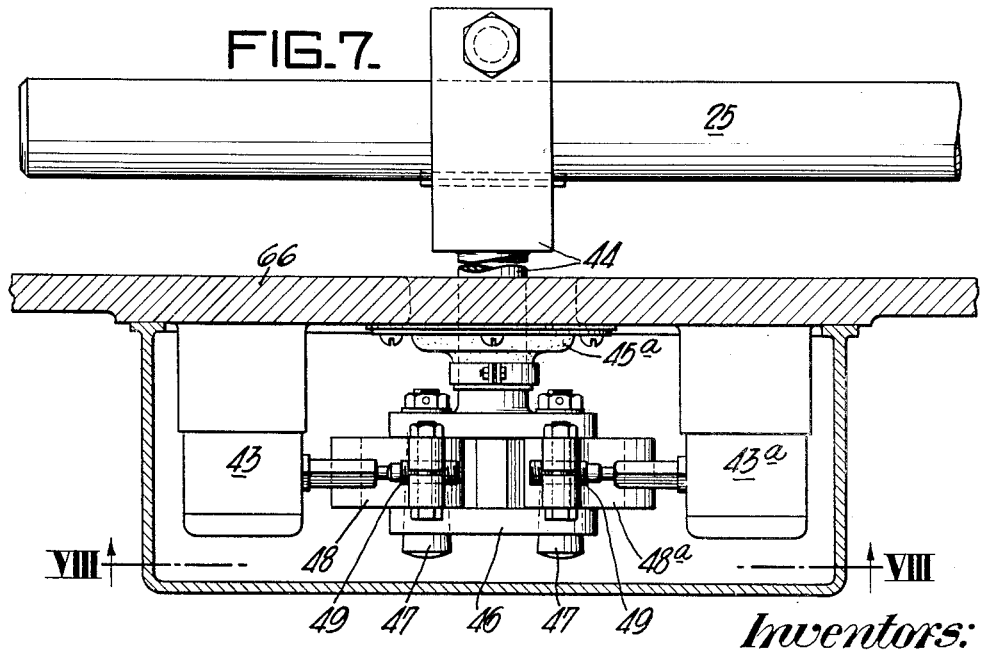
Figure 7 is a plan view of a mechanism for actuating electric switches operating valves controlling the hydraulic motor, the enclosing case being shown in section.

Figures 7, 8 and 9 show a mechanism for actuating electric switches adapted to exercise control of cylinder 18 through solenoid valves to effect the same adjusting movement of the test head as provided by valve 24. The switches shown at 43 and 43a are of the plunger type and are mounted in opposed relation on a bracket 66 connected to water end 10. A lateral arm 44 secured on push-rod 25 extends through an opening 45 in the bracket and has a T-head 46 at the outer end. A rubber diaphragm 45a closes the space between the arm 44 and bracket 66. The head is drilled to accommodate two taper pins 47 having nuts threaded on their smaller ends and providing journals for a pair of bell cranks 48 and 48a. The upper arm of each crank has a stud 49 threaded therethrough and adapted to engage the plunger of one of the switches. A tension spring 50 connects the lower arms of the bell cranks and constantly urges stop fingers 51 against the bottom of head 46.

It will be evident that push-rod 25, as it is moved in one direction or the other as already explained, by the gripper on shortening or elongation of the pipe length under test, will operate one of the switches 43, 43a. By suitable control circuits, the switches energize the operating coils of solenoid valves which together perform the same function as valve 24, i. e., they operate an intermediate valve which admits power fluid to cylinder 18 or relieves it therefrom to produce the compensation or followup of the test head already described.

Figure 13 shows switches 43 and 43a connected to a double solenoid operated valve 67. Conduit 68 connects valve 67 to inlet 22. Conduit 69 joins valve 67 with a source of additional fluid. Conduit 70 leads from valve 67 to a drain tank 71. The operation of valve 67 with respect to adding fluid to or relieving fluid from cylinder 18 is similar to the operation of valve 24. For example, when a pipe contracts, rod 25, acting through arm 44 and T head 46, trips switch 43a which energizes solenoid 72. With solenoid 72 energized, a spool (not shown) corresponding to spool 65 of valve 24 moves to a position similar to that shown in Figure 12 whereby additional fluid flows from conduit 69 through valve 67 to conduit 68, thence to inlet 22. When a pipe expands, rod 25, acting through arm 44 and T head 46, trips switch 43 which energizes solenoid 73. With solenoid 73 energized, the spool (not shown) moves to a position similar to that shown in Figure 10 whereby fluid is relieved from cylinder 18 through inlet 22, through conduit 68 to valve 67, thence through conduit 70 to drain tank 71. The spool of valve 67 is in a neutral position similar to that shown in Figure 11 when both solenoids are de-energized.

From the foregoing it will be apparent that the invention is characterized by important advantages. The compensating adjustment of the test heads insures proper cooperation of the seals with the pipe ends, preventing damage to the seals and giving them a long life, in addition to eliminating the possibility of leaking at the seals. The control mechanism is simple in construction and automatic in operation. It exerts its effect through the hydraulic motor ordinarily provided to advance and retract the test head into and out of engagement with the end of the pipe length.

Although we have illustrated and described a preferred embodiment of the invention and a modification, it will be understood that this is by way of example only, and that changes may be made in details without departing from the spirit of the invention.

We claim:

1. In a pipe-testing machine including a frame, a test head mounted adjacent one end thereof for movement axially toward and from a pipe length disposed longitudinally in said frame, said head having a bore opening inwardly from the exposed end thereof adapted to receive one end of the pipe length and make a fluid-tight seal thereto, a fluid motor on said frame for reciprocating said head, the combination therewith of a gripper adapted to seize the pipe length at a point inwardly from said end, means mounting said gripper for movement axially of the test head, and means for controlling the supply of fluid to said motor and its relief therefrom, said means being actuated by movement of said gripper relative to said test head whereby a substantially constant spacing is maintained between the end of the pipe length and the inner end of said bore on shortening or elongation of the pipe length.

2. Apparatus as defined by claim 1 characterized by said last-mentioned means being a valve mounted rigidly with said test head and a member extending from said gripper to said valve, said member actuating said valve by movement of said gripper relative to said head.

3. Apparatus as defined by claim 1 characterized by said last-mentioned means being a pair of switches mounted rigidly with said test head and means extending from said gripper to said valve for actuating said switches individually depending on the direction of movement of the gripper relative to the test head.

4. Apparatus as defined by claim 1 characterized by said last-mentioned means including a push-rod extending from said gripper toward said test head, a valve on said test head, and spaced fingers on said rod for actuating the valve in accordance with the direction of movement of the gripper relative to said head.

5. Apparatus as defined by claim 1 characterized by said last-mentioned means being a pair of switches mounted rigidly with said test head, said switches actuating a valve for controlling the supply of fluid to said motor and its relief therefrom, and means extending from said gripper to said switches for actuating said switches individually depending on the direction of movement of the gripper relative to the test head.

6. In a pipe testing machine including a frame, a test head mounted adjacent thereof for movement axially toward and from a pipe length disposed longitudinally in said frame, said head having a bore opening inwardly from the exposed end thereof adapted to receive one end of the pipe length and make a fluidtight seal therewith, a fluid motor on said frame for reciprocating said head, the combination therewith of a member adapted to engage the pipe length, means mounting said member for movement axially of the test head and means for controlling the supply of fluid to said motor and its relief therefrom, said means being actuated by movement of said member relative to said test head whereby a substantially constant spacing is maintained between the end of the pipe length and the inner end of said bore on shortening or elongation of the pipe length.

7. In a pipe testing machine including a frame, a test head mounted adjacent thereof for movement axially toward and from a pipe length disposed longitudinally in said frame, said head having a bore opening inwardly from the exposed end thereof adapted to receive one end of the pipe length and make a fluidtight seal therewith, a fluid motor on said frame for reciprocating said head, the combination therewith of a member adapted to engage the pipe length, means for maintaining said member in engagement with the pipe length, means mounting said member for movement axially of the test head and means for controlling the supply of fluid to said motor and its relief therefrom, said means being actuated by movement of said member relative to said test head whereby a substantially constant spacing is maintained between the end of the pipe length and the inner end of said bore on shortening or elongation of the pipe length.

References Cited in the file of this patent

UNITED STATES PATENTS

| | | |
|---|---|---|
| 1,090,575 | Shannon | Mar. 17, 1914 |
| 1,972,630 | Neale et al. | Sept. 4, 1934 |
| 2,059,023 | Perry | Oct. 27, 1936 |
| 2,289,140 | Mohan | July 7, 1942 |
| 2,326,345 | Ernst et al. | Aug. 10, 1943 |
| 2,329,035 | Cross | Sept. 7, 1943 |
| 2,497,193 | Webb | Feb. 14, 1950 |
| 2,581,969 | Orr | Jan. 8, 1952 |